Oct. 20, 1936.        M. W. SULLINS        2,057,858
VALVE CONSTRUCTION
Original Filed March 9, 1931

Inventor
Marion W. Sullins
By Braselton, Whitcomb Davies
Attorney

Patented Oct. 20, 1936

2,057,858

UNITED STATES PATENT OFFICE 2,057,858

VALVE CONSTRUCTION

Marion W. Sullins, Toledo, Ohio, assignor to Thompson Products, Incorporated, Cleveland, Ohio, a corporation of Ohio Application March 9, 1931, Serial No. 521,158
Renewed December 24, 1934

18 Claims. (Cl. 123—188)

This invention relates to a method and means for increasing the heat conductivity of elements which are subjected to intense heat and more particularly pertains to such means and methods for increasing the heat conductivity of poppet valve constructions for internal combustion engines.

The invention has for an object the provision of a valve structure composed of a major heat resisting material combined with another material forming a part of the valve structure which has different heat conductive characteristics.

The invention contemplates the provision of a poppet valve structure having an insert of different material than that of which the valve proper is constructed and having distinctively different heat conducting or dissipating characteristics, and wherein a means or method is provided for taking care of the difference in expansion of the two materials when they are subjected to compartively high degree of heat.

The invention further embraces a valve structure wherein the valve seating surface is provided with a comparatively elastic material having a high heat conducting characteristic and arranged such that any warping or distortion of the valve caused by its being subjected to heat will be compensated or accommodated by means of a particular valve face construction.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which.

Figure 1:
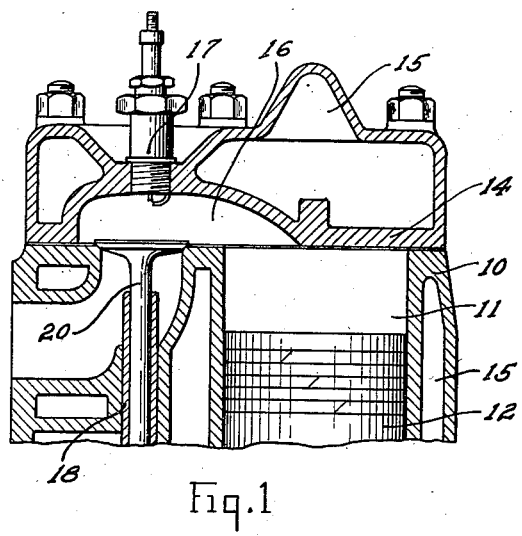
Figure 1 is a transverse sectional view through the head portion of an internal combustion engine of conventional construction, showing the general arrangement of parts.
Figure 3:
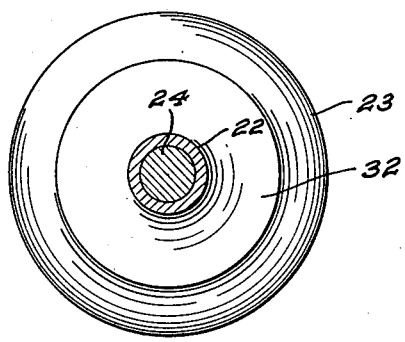
Figure 3 is a sectional view through the valve taken substantially on the line 3—3 of Figure 2.

While I have illustrated my invention as embodied in a poppet valve of the type particularly adapted for incorporation in internal combustion engines, it is to be understood that I contemplate the use of same in any structures wherever it may be found applicable. Referring to the drawing in detail, the portion of an internal combustion engine illustrated comprises a block 10 having a plurality of cylinders 11 one being illustrated within which is reciprocably positioned a piston 12, the engine having a removable head portion 14 formed with a combustion chamber 16 above which is suitably positioned a mixture igniting means or spark plug 17. The cylinder and head portion in the embodiment illustrated are cooled by means of circulating water in jackets or compartments 15.

Positioned at one side of the cylinder 11 and axially parallel therewith is a valve guide 18 within which is reciprocably positioned a valve 20 constructed in accordance with my invention, operated by suitable mechanism (not shown). One form of valve structure 20 and parts thereof are particularly illustrated in Figures 2 through 5 inclusive, the valve essentially comprising a stem structure 22 and a frustro-conical head portion 23 which are formed of suitable metal as, for example, steel. The stem 22 is preferably drilled or bored to receive an insert or core of material having efficient and effective heat conducting or radiating characteristics such, for example, as copper, the core being designated 24.

The core is preferably held permanently in place by means of a suitable plug or retaining member 25 of steel or other material which may be electrically welded as at 26 or otherwise secured in the end of the bore in the valve stem 22. In this connection it should be noted that the extremity 27 of the bore is preferably unoccupied by any portion of the core in order to provide a space for expansion should there be a material difference between the co-efficients of expansion of the materials of which the valve proper and core are fabricated.

I have found it desirable that the head portion 23 be provided with in insert of material having the high degree of heat conducting or radiating characteristics and to this end the head portion 23 is provided with an annular recess within which is adapted to be positioned an annulus or insert 30 of copper or other suitable material which is held in place by means of a retaining ring or annulus 32 of steel or other suitable material. This ring 32 is preferably secured to the head portion as at 33 and to the stem portion as at 34 by welding or other suitable means. I have found that these parts are particularly adapted to be electrically welded after which operation the welded portions may be machined or ground, the finished construction being of such a nicety that it is practically impossible to determine that the composite valve head is not an integral member. In this manner I have provided a valve structure having exceptionally high heat conducting or radiating characteristics yet one in which all the parts are integral and of such nature that the component parts will not become disarranged during use.

Figure 6:
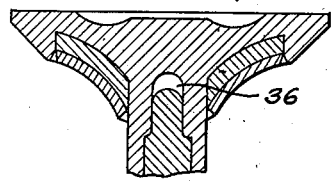
Figure 6 is a view similar to Figure 2 showing another form of my invention.
Figure 4:
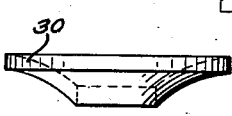
Figure 4 is an elevational view of the insert per se for the valve head.
Figure 2:
Figure 2 is an enlarged vertical sectional view through a valve of one form of my invention.
Figure 5:
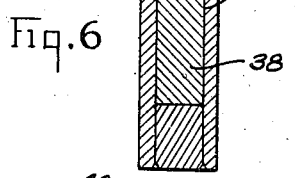
Figure 5 is an elevational view of a metallic ring for holding the insert in position in the valve.

The form of valve structure illustrated in Figure 6 is similar to that hereinbefore described; with an exception that the bore 35 within which the core is positioned is provided with a reduced portion 36 to take care of longitudinal expansion of the core 38 in the stem of the valve, the insert however snugly fitting the walls of the bore 35 so that the parts will not become in any manner loosened when the valve is in operation.

Figure 7:
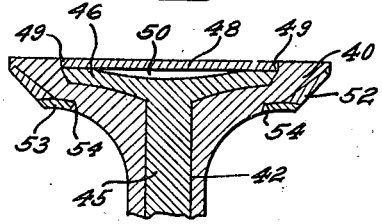
Figure 7 is a view similar to Figure 6 showing still another form of the invention.

The form of my invention illustrated in Figure 7 comprises an integral head portion 40 and stem 41, the latter being suitably bored out as at 42 to receive the core 43 fabricated of material having high heat radiating efficiency. The core 43 comprises a stem portion 45 and an integral flanged head portion 46 which occupies an enlarged cup-like recess in the head 40 of the valve. After the core 43 has been properly positioned within the valve stem and head portions, a disc 48 is then inserted above the flanged portion of the core 43 and preferably welded to the valve head portion as at 49, in the device illustrated the upper surface of the disc 48 being in a plane with the upper surface of the valve head 40. The upper extremity of the core 43 is preferably depressed or formed with a recess as at 50 so as to provide a suitable space for expansion of the insert should there be a material difference in the co-efficients of expansion of the materials from which the valve and core are made.

In the form of valve illustrated in Figure 7, I have provided the valve seat with an insert 52 of copper or other suitable material which is preferably held in place by means of an annulus or ring 53 electrically welded in position as at 54. I have found such an insert of comparatively soft material forming a valve seat highly desirable as any warping of the valve will be compensated for because the soft valve seat made, as for example, from copper, will be distorted through the constant "hammering" of the valve during operation and thus at all times a perfect valve seal or seat will be had.

Figure 8:
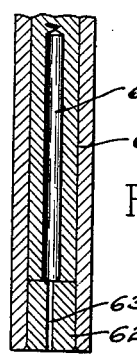
Figure 8 is a fragmentary view of a valve stem showing a form of heat conducting element therein.

In Figure 8 of the drawing, I have illustrated a modified form of means for taking care of any expansion of the heat radiating insert 61 in which is provided a vertical bore 60. A plug 62 serves to hold the insert 61 within the valve stem and is provided with a minute channel or opening 63 for the ingress and egress of air resulting from differential temperatures.

It is apparent that, within the scope of the invention modifications and different arrangements may be made other than is herein disclosed, and the present disclosure is illustrative merely, the invention comprehending all variations thereof.

What I claim is:

1. A valve for internal combustion engines having a stem portion and a head portion, said head portion having an annular core of material having comparatively high thermal conductivity.

2. A valve of the character disclosed having a hollow stem portion and a head portion, the latter having a recess therein, said recess and stem portion having cores of material having a comparatively high thermal conductivity characteristic, said cores being completely enclosed within said stem and head portions.

3. A valve of the character disclosed having a hollow stem portion and a head portion having an annular recess therein, and inserts in said recess and said hollow stem portion of material having a comparatively high thermal conductivity characteristic.

4. A valve of the character disclosed comprising a stem and head portion, said head portion having a recess; a material having high thermal conductivity characteristics in said recess; and a closure for completely enclosing the recess.

5. A valve of the character disclosed comprising a stem and head portion, said head portion having an annular recess; and an insert in said recess fabricated of material having high thermal conductivity characteristics.

6. A valve of the character disclosed having a stem portion and a head portion, the latter having an annular recess therein, an annular insert in said recess, said insert being fabricated of material having comparatively high thermal conductivity characteristics.

7. A valve of the character disclosed comprising a metallic stem and head portion; a core formed of a high heat conductive metal positioned in said stem and head portion; and a metal disc secured on said head portion for enclosing said core within the valve.

8. A valve of the character disclosed comprising a stem and head portion fabricated of steel; a core positioned in said stem and head portion formed chiefly of copper; and a steel disc welded to said head portion in spaced relation above the top of the core for enclosing said core within the valve and for defining an expansion space between said core and said disc.

9. A valve of the character disclosed having an integral stem and head portion, the periphery of said head portion having an insert of comparatively soft material; and means for holding said insert in position.

10. A valve of the character disclosed comprising an integral stem and head portion; a peripheral recess in said head portion; a copper insert in said recess; and an annulus for holding said insert in position.

11. A valve of the character disclosed comprising an integral stem and head portion; a peripheral recess in said head portion; a copper insert in said recess; and an annulus for holding said insert in position, said annulus being welded to said valve.

12. A valve of the character disclosed comprising a hollow stem and head portion; a core in said stem and head portions formed chiefly of copper; and a copper insert forming a seat portion for said valve.

13. A member of the character disclosed having a head portion and a stem portion, said head portion having a recess therein; said stem portion being hollow throughout a portion of its length; said recess and said hollow stem portion having a core of material of comparatively high thermal conductivity characteristic, said core being completely enclosed within said recess and stem portions.

14. A valve of the character disclosed comprising a stem portion and a head portion, said head portion having an annular recess therein; said stem portion having a central bore extending throughout a portion of its length thereof and communicating with said recess, and a core of material having high thermal conductivity characteristic inserted in said recess and said bore.

15. A valve of the character disclosed having a stem portion and an annular recessed head portion; said stem portion having a bore throughout a portion of its length and a core consisting chiefly of copper inserted in said recessed head portion and the bore in said stem portion.

16. A valve of the character disclosed comprising a stem and head portion, said head portion having a recess; a material having high thermal conductivity characteristics in said recess; and a welded closure to said head portion for completely enclosing the recess.

17. A valve of the character disclosed comprising a stem and head portion, said head portion having an annular recess; a material having high thermal conductivity characteristics in said recess; and a welded closure to said head portion for completely enclosing the recess.

18. A valve of the character disclosed comprising a stem and head portion, said stem and head portion each having a recess; a core of material having high thermal conductivity characteristic in each of said recesses; and means for completely enclosing the core in said recesses.

MARION W. SULLINS.